US009783093B1

(12) United States Patent
Esch

(10) Patent No.: US 9,783,093 B1
(45) Date of Patent: Oct. 10, 2017

(54) TRUCK MOUNTED EXTENSIBLE CONVEYOR SYSTEM

(71) Applicant: Custom Truck & Equipment LLC, Kansas City, MO (US)

(72) Inventor: James H. Esch, Georgetown, TX (US)

(73) Assignee: Custom Truck & Equipment LLC, Kansas City, MO (US)

( * ) Notice: Subject to any disclaimer, the term of this patent is extended or adjusted under 35 U.S.C. 154(b) by 0 days.

(21) Appl. No.: 15/082,133

(22) Filed: Mar. 28, 2016

(51) Int. Cl.
B65G 23/44 (2006.01)
B60P 1/36 (2006.01)
B65G 41/00 (2006.01)

(52) U.S. Cl.
CPC .............. B60P 1/36 (2013.01); B65G 41/001 (2013.01); B65G 41/008 (2013.01)

(58) Field of Classification Search
CPC ........ B65G 41/001; B65G 41/008; B60P 1/36
USPC ........ 198/315, 317, 812, 813; 414/501, 502, 414/523
See application file for complete search history.

(56) References Cited

U.S. PATENT DOCUMENTS

| 2,856,062 | A | * | 10/1958 | Kling | ...................... | B65G 65/28 |
| | | | | | | 198/302 |
| 3,642,041 | A | * | 2/1972 | Hamilton | .............. | A01G 23/097 |
| | | | | | | 144/338 |
| 3,682,288 | A | * | 8/1972 | Montacie | ............... | B65G 19/08 |
| | | | | | | 198/520 |
| 5,984,077 | A | * | 11/1999 | Frye | ........................... | B60P 1/36 |
| | | | | | | 198/317 |
| 6,283,697 | B1 | * | 9/2001 | Pierce | ........................ | B60P 1/36 |
| | | | | | | 198/316.1 |
| 6,305,896 | B1 | * | 10/2001 | Szentimery | ............... | B60P 1/36 |
| | | | | | | 198/605 |
| 6,349,812 | B1 | * | 2/2002 | Epp | ......................... | B65G 23/44 |
| | | | | | | 198/318 |
| 6,431,346 | B1 | * | 8/2002 | Gilmore | .................. | B65G 21/14 |
| | | | | | | 198/588 |
| 6,516,941 | B1 | * | 2/2003 | Buhne | .................... | B65G 23/44 |
| | | | | | | 198/314 |
| 6,688,450 | B2 | * | 2/2004 | Speers | .................. | B65G 41/005 |
| | | | | | | 198/303 |
| 6,695,130 | B1 | * | 2/2004 | Blaylock | ................. | B65G 23/44 |
| | | | | | | 198/813 |
| 6,802,414 | B2 | * | 10/2004 | Buhne | .................... | B65G 23/44 |
| | | | | | | 198/813 |
| 8,033,775 | B2 | * | 10/2011 | Donelson | .................. | B60P 1/38 |
| | | | | | | 198/312 |

(Continued)

Primary Examiner — Douglas Hess
(74) Attorney, Agent, or Firm — Lathrop Gage LLP

(57) ABSTRACT

A truck mounted conveyor system for transporting building materials to a station remote from the truck. The truck with conveyor system comprises a base platform mounted to the truck frame and an inner boom pivotally mounted to the base platform and configured to extend outward of said bed platform over a range of elevations and azimuths. The outer boom pivotally secured to the inner boom with a continuous conveyor belt circumscribing the inner and outer booms. The inner boom including a tensioner mechanism for maintaining a predetermined tension in the conveyor belt wherein the combination of inner boom and outer boom can be configured to minimize the overall length of the conveyor system while in transit in order to comply with applicable state overall vehicle length regulations and also maximize conveyor system length during conveying operations.

23 Claims, 7 Drawing Sheets

(56) References Cited

U.S. PATENT DOCUMENTS

| | | | | |
|---|---|---|---|---|
| 8,186,497 B2* | 5/2012 | Mackin | ............ | A01D 41/1217 |
| | | | | 198/312 |
| 8,506,232 B2* | 8/2013 | Gallione | ............ | B60P 1/36 |
| | | | | 198/314 |
| 8,707,627 B2* | 4/2014 | Murray | ............ | E06B 11/045 |
| | | | | 49/324 |
| 8,851,276 B2* | 10/2014 | Strieker | ............ | B65G 15/60 |
| | | | | 198/810.04 |
| 9,260,247 B2* | 2/2016 | Miller | ............ | B65G 15/58 |
| 9,371,187 B2* | 6/2016 | Priepke | ............ | B65G 15/08 |
| 9,598,902 B2* | 3/2017 | Hong | ............ | E06C 5/04 |

* cited by examiner

TRUCK MOUNTED EXTENSIBLE CONVEYOR SYSTEM

FIELD

This invention relates to boom type conveyors for delivering packages or materials onto roofs or other elevated locations.

BACKGROUND

This disclosure relates particularly to overhead conveyors as are used to deliver materials to elevated locations such as roof tops. In particular, the invention applies to such conveyors which are vehicle mounted and may be part of a delivery truck for transporting materials such as roofing shingles. The truck is driven to a site where roofing or other construction material is to be utilized or building features repaired, and the conveyor is positioned as to its elevation and azimuth using its own power drive equipment.

Various forms of delivery trucks of the self-unloading type are used to transport roofing materials to a building site. In general, vehicles presently in service are flat-bed straight trucks fitted with boom-like devices. One such device comprises a turret mounted boom-like conveyor which can convey individual packages from a position at the conveyor turret to a site distant from, and commonly above, the vehicle bed. The swinging conveyor requires the shingle packages to be carried to the discharge conveyor, where they are conveyed to the chosen delivery site, such as upon a roof.

SUMMARY

The present disclosure relates to those vehicles which utilize an off-loading conveyor fitted to the vehicle body. A vehicle, such as a flat-bed delivery truck, is fitted with a conveyor for carrying packages of material, such as roofing shingles, from the flat bed to the elevated location. The conveyor can swing in an arc about its turret-type mounting adjacent the transfer station, and its angle of incline with respect to the bed platform can be adjusted, so as to reach a wide variety of delivery sites, such as on a roof adjacent where the vehicle is parked, or on the ground adjacent the vehicle.

The type of truck commonly utilized with conveyors are known as straight trucks which are subject to Federal weight requirements on the Interstate System and Federal width requirements on the national network, but not to Federal length requirements. Vehicle length regulation remains with the States. However, the most common length restriction is a 40 foot maximum length for straight trucks.

A state imposed length restriction limits the total length of the boom to the state length limitation. The inner and outer articulating boom design disclosed herein allows additional length to be added to the overall boom length thereby increasing the versatility of the boom truck and a wider range of projects to which the straight truck/conveyor combination can be used.

The principal object of the invention, therefore, is to provide self-unloading apparatus for a vehicle which can carry a large number of loads, for example pallets of stacked packages or a plurality of goods in cartons or cases, which apparatus can move those loads using articulating inner and outer booms to a transfer station where they can easily be off loaded, or transferred to a delivery station with a minimum of lifting, and which can deliver the packages in serial fashion to a chosen site. The disclosed apparatus assists unloading, or in certain instances loading, of such a delivery vehicle to the point that a single person can control the functions of the apparatus and can also place the packages onto the delivery conveyor from the stacks of packages on the palletized loads, or to replace the packages on pallets on the lift platform, with minimized effort and with substantial saving of time.

Other objects and advantages of the invention will be apparent from the following description, the accompanying drawings and the appended claims. Various objects, features, aspects and advantages of the inventive subject matter will become more apparent from the following detailed description of preferred embodiments, along with the accompanying drawings in which like numerals represent like components.

DETAILED DESCRIPTION

The disclosed technology relates to straight non-articulating vehicles which utilize an off-loading conveyor fitted to the vehicle body. A vehicle, such as a flat-bed delivery truck, is fitted with a serial unloading conveyor for carrying packages of material, e.g. roofing shingles. This conveyor can swing in a full circle atop its turret-type mounting, and its azimuth, i.e. its angle of incline with respect to the bed platform can be adjusted, so as to reach a wide variety of delivery sites, such as on a roof adjacent where the vehicle is parked, or on the ground adjacent the vehicle.

Federal regulations found at 23 C.F.R. §658 govern truck and bus size and weight; however, vehicle length regulation remains with the State for straight trucks. The most common length restriction, applicable in over twenty states as of 2015, is a 40 foot maximum length for straight trucks. Some states, for example Colorado and Idaho extend that length to 45 feet. With these length limitations a boom secured to a flat-bed straight truck cannot exceed 40 feet. State restrictions can thereby greatly inhibit the scope of projects that a truck mounted conveyor can support as it relates to the available reach of the conveyor. Providing an increase in length of approximately five feet using the inner boom configuration disclosed herein can greatly facilitate the timely completion of construction projects.

Figure 1:
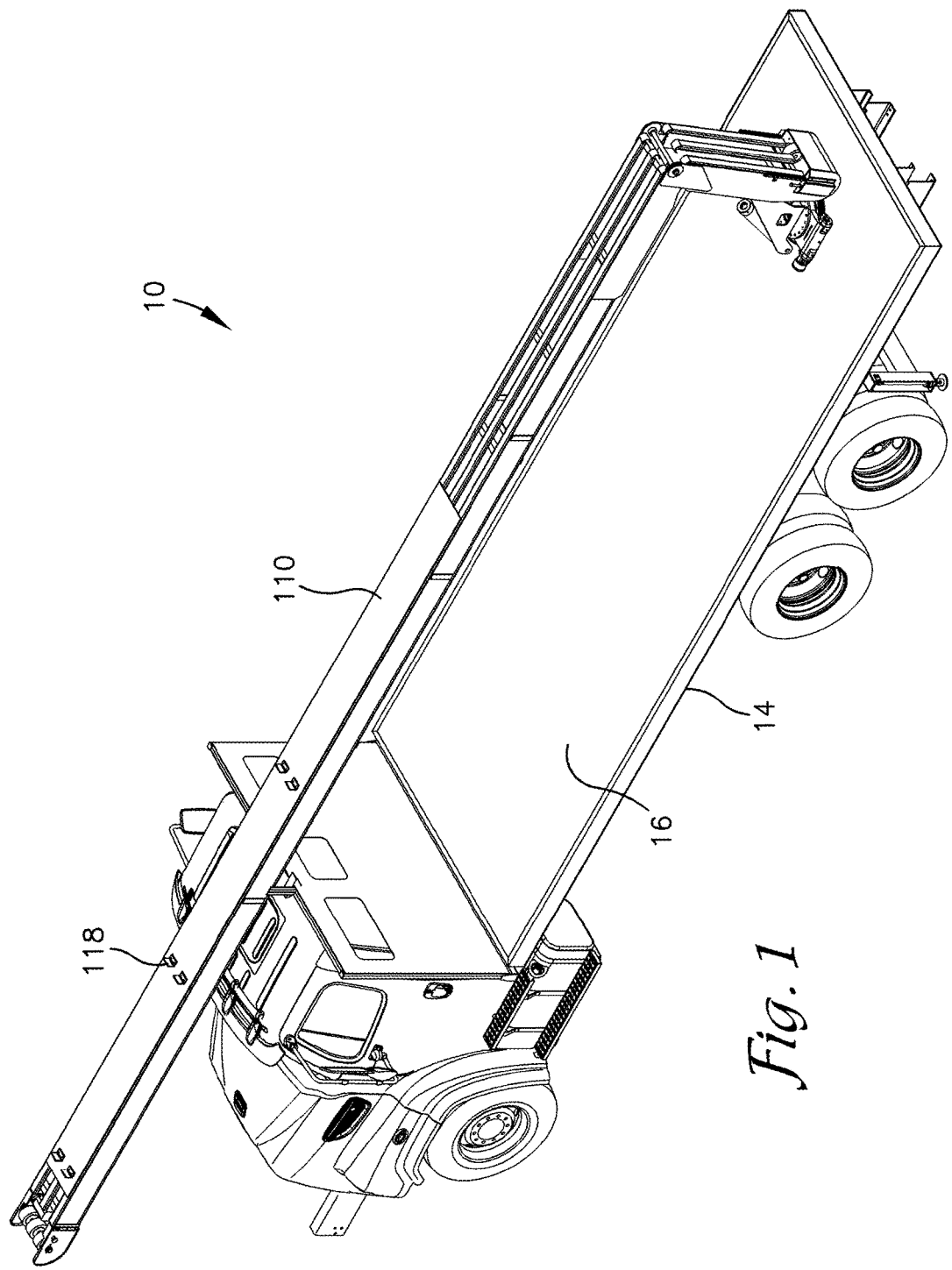
FIG. 1 is a perspective view of an embodiment of the truck mounted conveyor system in a highway transit configuration.
Figure 2:
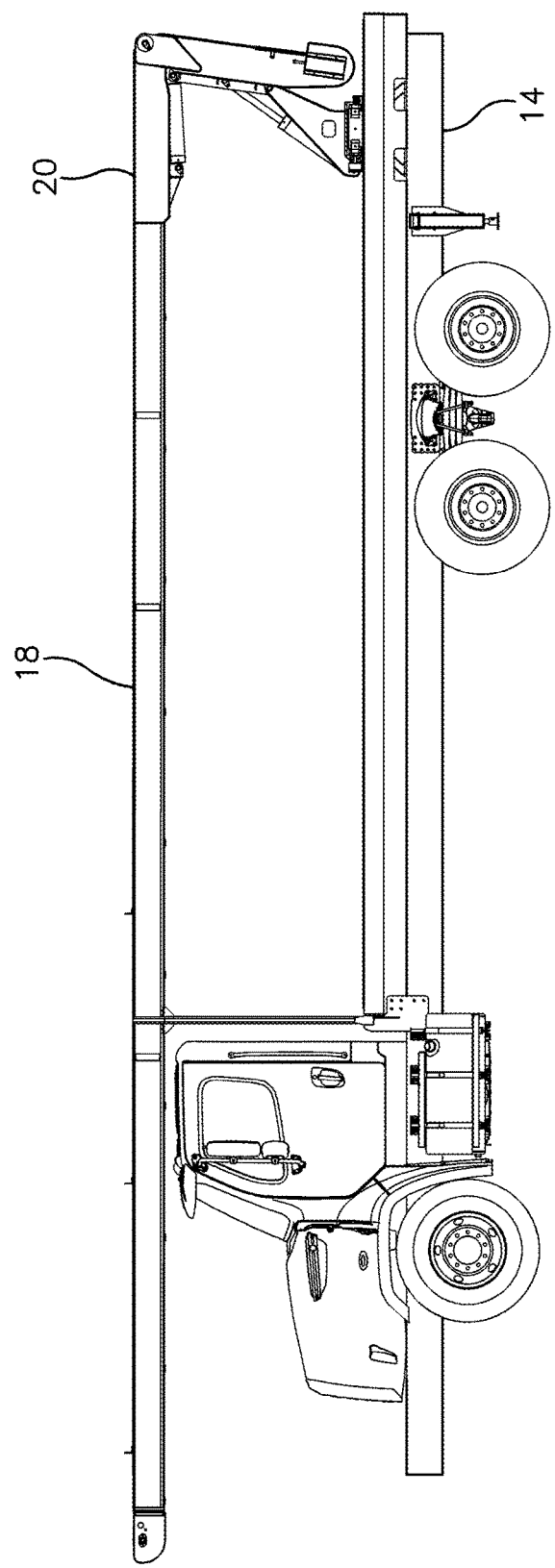
FIG. 2 is a side elevation view of an embodiment of the truck mounted conveyor system in a highway transit configuration.
Figure 6:
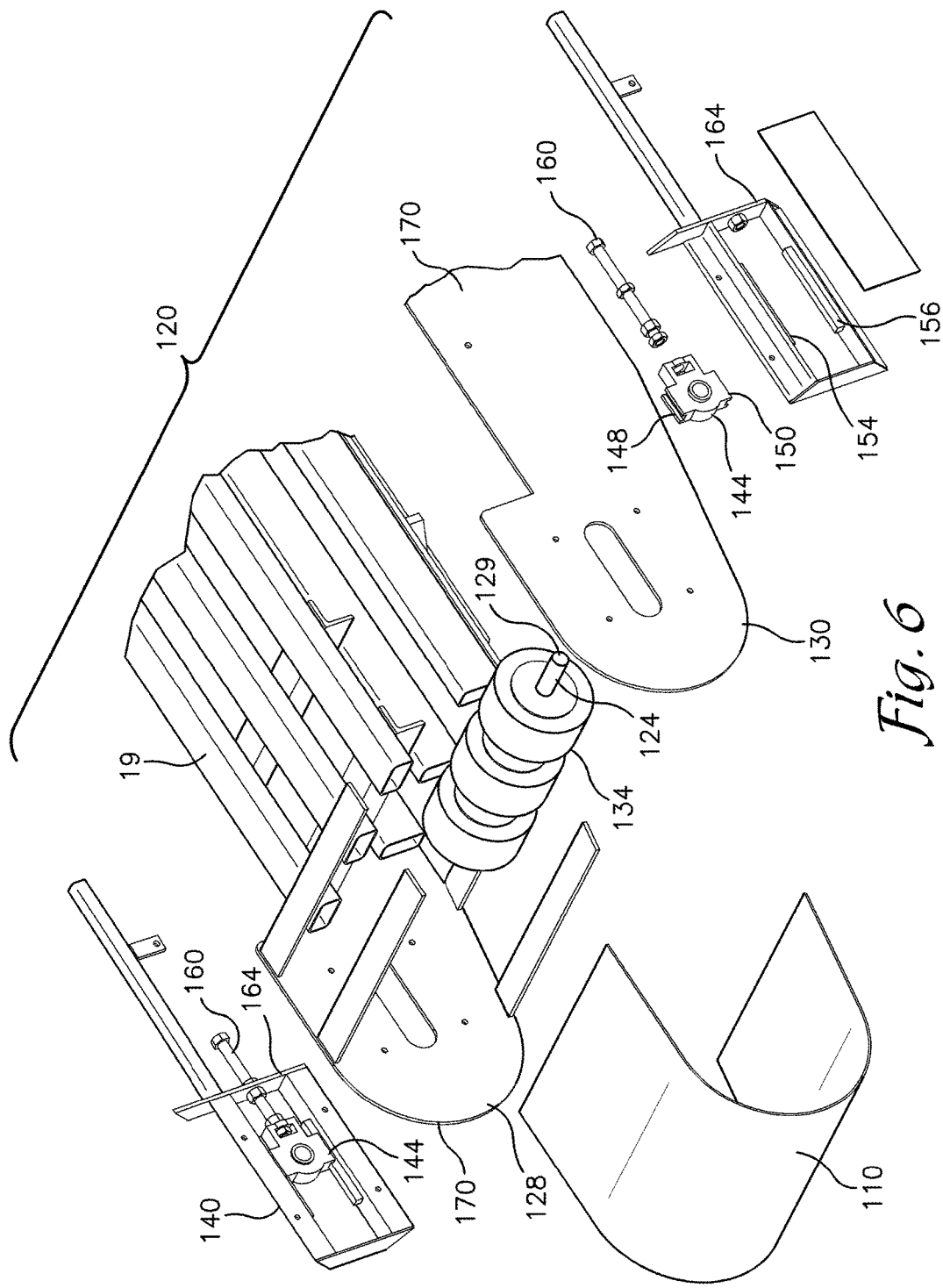
FIG. 6 is an exploded view of an embodiment of a conveyor belt tensioning mechanism of the inner boom.

FIG. 1 reveals a perspective view of a straight truck utilizing a conveyor system 10 employing the disclosed technology. Specifically, FIG. 1 reveals a straight truck 14, the length of which is controlled by the applicable state law. The straight truck utilizes a frame area 16 capable of supporting building materials or other supplies for use at, for example, a construction site. FIG. 2 illustrates a side elevation view of the same truck 14 as shown in FIG. 1 detailing the travel length of the outer boom structure 18 that is limited by the applicable state law. As discussed above, this outer boom structure 18 can be no longer than 40 feet in over twenty states. The inner and outer boom structures 20, 18 are preferably constructed of welded steel or aluminum plate and internal tubular structural members 19, as best seen in FIG. 6, to provide optimal strength with minimal conveyor system weight for carrying loads when the conveyor is in operation.

Figure 3:
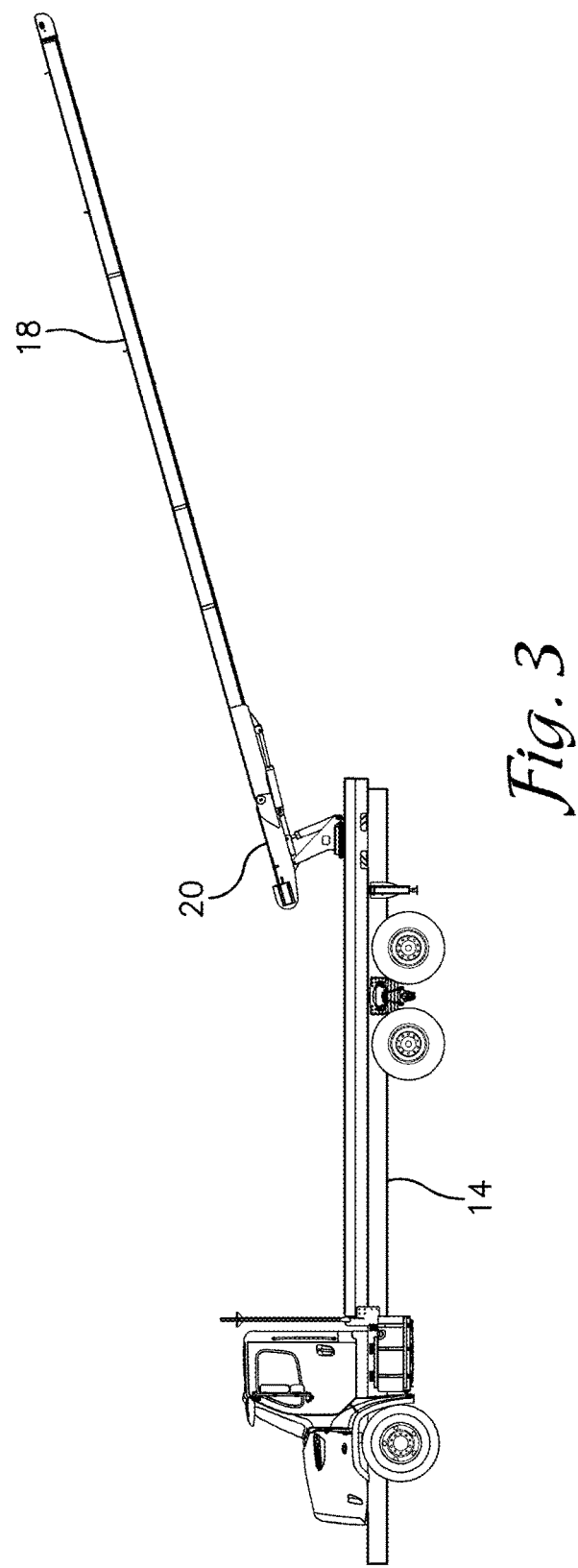
FIG. 3 is a side elevation view of an embodiment of the truck mounted conveyor system in an operational conveyor configuration.

FIG. 3 details the truck 14 shown in FIGS. 1-2 but in a material conveying configuration. The outer boom 18 and the inner boom 20 when configured as depicted in FIG. 3 reveal how the inner boom can extend the overall length of the combined conveyor system 26 by, for example, an additional five, or more, feet. It is the capability of the inner boom 20 to align with outer boom 18 to form an increased working length that is very attractive to those in the construction material sales, transport and delivery business.

Figure 4:
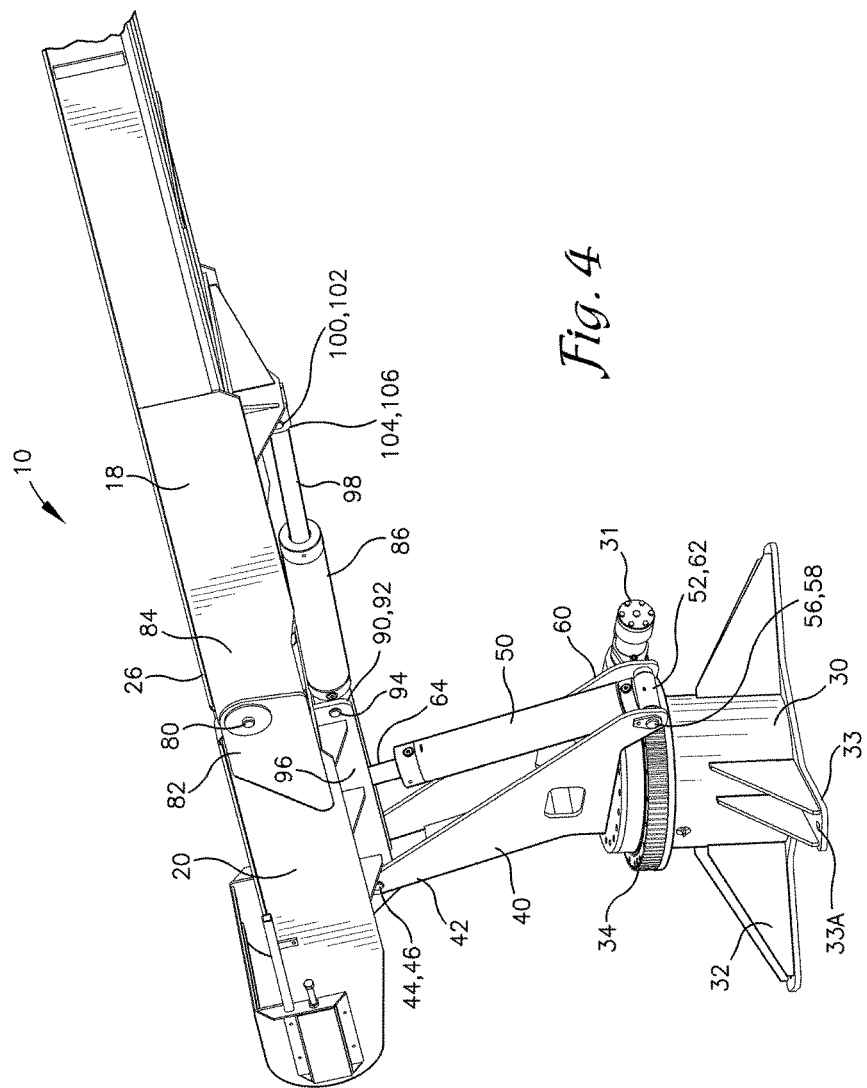
FIG. 4 is a perspective view of an embodiment of the inner boom.

FIG. 4 provides a close-up perspective view of the conveyor system 10 detailing a base element 30 with four outwardly extending double flanges 32 and mounting plates 33 with through holes 33A, for securing the base element 30 to the frame 16 of the truck 14. The conveyor system 10 is capable of rotation above the ring gear 34 and can be rotated to any orientation required for delivery of the conveyed materials. The means for rotation of the base element 30 above the ring gear 34 is typically provided by a hydraulic motor 31; however, electric drive motors are also contemplated. The output shaft of the drive motor 31 utilizes a gear that engages with the ring gear 34. As the drive motor 31 is energized the drive gear rotates the ring gear 34 causing the integrated inner and outer booms 20, 18 to rotate.

FIG. 4 provides further detail on the configuration of the inner boom structure secured to the base element 30. The inner boom structure 20 is capable of rotating about the base element 30 that is mounted to the frame area 16. The inner boom 20 is secured to the base element 30 by at least two vertical support elements 40. The vertical support elements 40 extend upwardly from just above the ring gear 34 of the base element 30. At the upward end 42 of the vertical support elements 40 are pivot holes 44 extending through the vertical support elements 40 that are utilized to retain a pivot shaft 46 that extends between the two vertical support elements 40. The pivot holes 44 functioning in concert with the pivot shaft 46 and a first hydraulic cylinder 50 provides the capability to readily change the elevation of the inner boom structure 20.

Figure 5:
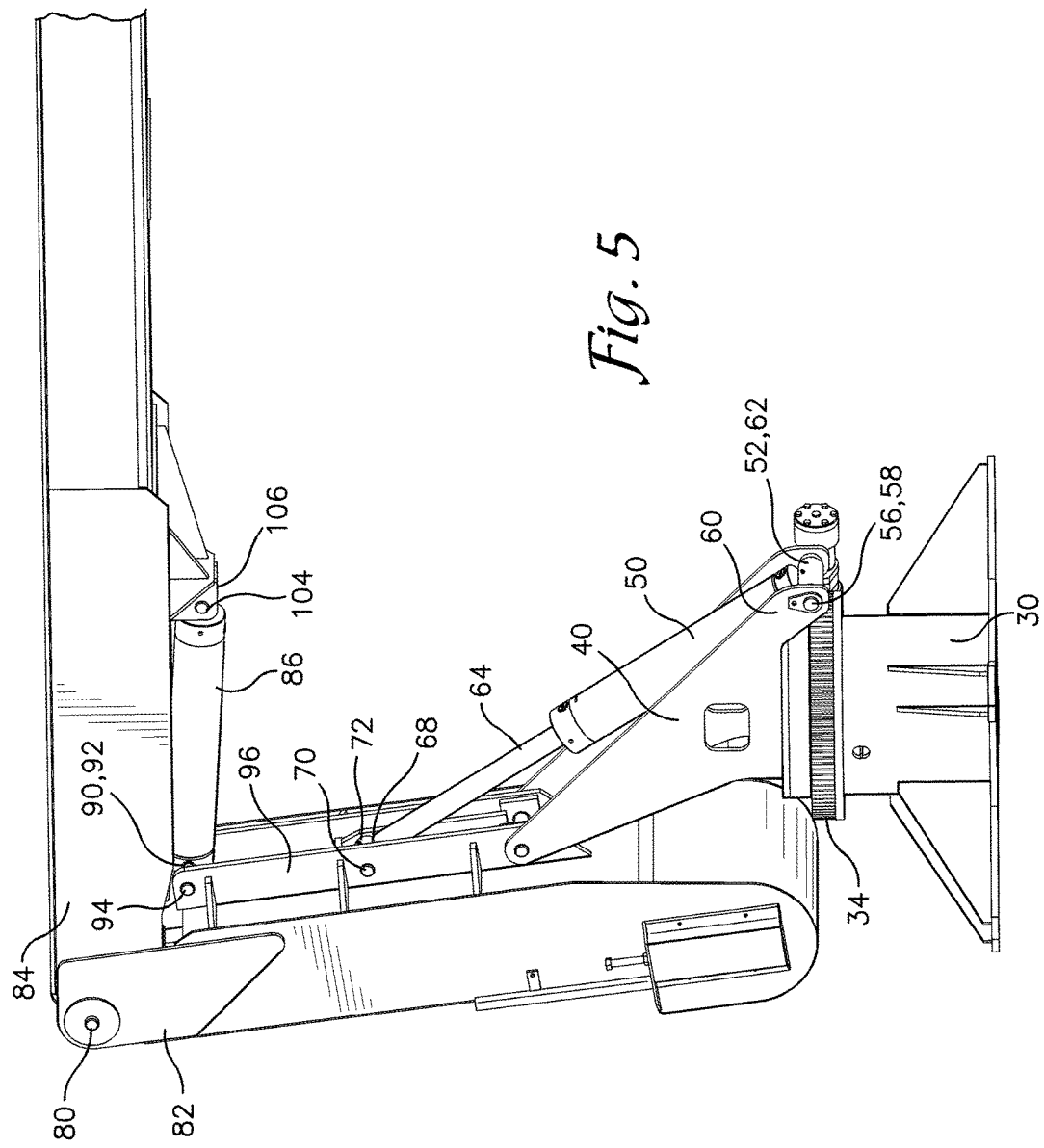
FIG. 5 is a side elevation view of an embodiment of the conveyor inner and outer booms.

As seen in FIGS. 4 and 5, the first hydraulic cylinder 50 has an end 52 mounted to the vertical support elements 40 above the ring gear 34 at a lower shaft member 56 extending horizontally between openings 58 at the lowermost ends 60 of the vertical support elements 40. The first hydraulic cylinder end 52 has a ring member 62 that circumscribes the lower shaft member 56 allowing the first cylinder end 52 to readily rotate as the first hydraulic piston rod 64 housed within the first hydraulic cylinder 50 extends out of or retracts into the cylinder 50. As seen in FIG. 5, the end 68 of the first hydraulic piston rod 64 is mounted to an upper horizontal inner boom shaft 70 with a ring member 72. As with the mounting of the first hydraulic cylinder 50 at the lower shaft member 56, the same mounting technique at the upper inner boom shaft 70 facilitates rotation, providing elevation and declination of the inner boom 20.

FIG. 4 also reveals that the inner boom 20 and the outer boom 18 are rotatably mounted to one another with a pivot pin 80 extending between the overlapping second end 82 of the inner boom 20 and the first end 84 of the outer boom 18. To facilitate rotation of the first end 84 of the outer boom 18 about the second end 82 of the inner boom 18 a second hydraulic cylinder 86 provides the necessary mechanical advantage. A first ring member 90 at the end 92 of the second hydraulic cylinder 86 is secured to a second inner boom shaft 94 disposed between inner boom support flanges 96. Extending outwardly from the second hydraulic cylinder 86 is a second hydraulic piston rod 98. The end 100 of the second hydraulic piston rod 98 includes a ring member 102 secured in position by a horizontally mounted outer boom shaft 104 secured in position between two vertical flanges 106.

The actuation of the second hydraulic cylinder 86 allows rotation of the outer boom 18 relative to the inner boom 20. Such that when the inner boom 20 is in a fully vertical orientation, as shown in FIG. 5, and the outer boom is in a fully horizontal orientation the overall configuration can be driven on roads and highways in states where the length of the outer boom 18 may be no greater than the state limit for straight trucks. FIG. 4 alternatively reveals the configuration of the inner and outer booms 20, 18 when maximum extension is needed.

Figure 7:
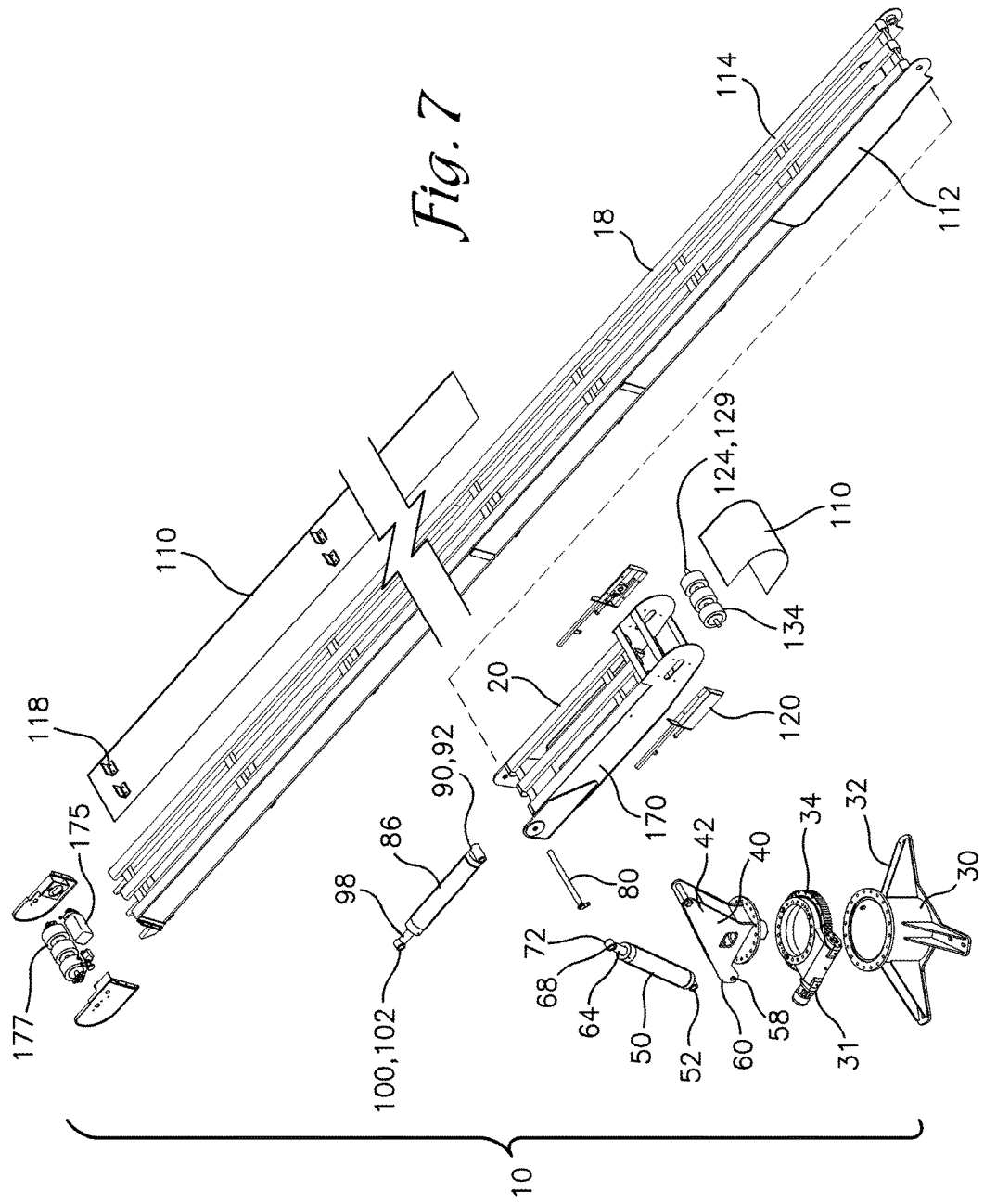
FIG. 7 is an exploded view of an embodiment of the conveyor belt inner and outer booms.

As best seen in FIG. 1 circumscribing the inner and outer boom structures 20, 18 is a conveyor belt 110. As seen in FIGS. 6 and 7, the conveyor belt 110 extends over tubular support members 19 while transiting the inner and outer boom structures. Exemplary of such support members are cylindrical rollers extending between the first 112 and second sides 114 of the inner and outer booms 20, 18. The conveyor belt is preferably fitted with cleats 118, or upwardly extending protrusions, of some configuration to prevent backward slippage of materials placed on the conveyor belt 110 when the outer boom is in an elevated orientation.

FIG. 6 details a conveyor belt 110 tensioning mechanism 120 disposed within the inner boom structure 20. The conveyor belt tensioning mechanism 120 utilizes a shaft 124 spanning from the first side 112 to the second side 114 of the conveyor system 10. The shaft 124 supports a plurality of idler rollers 134 over which the conveyor belt 110 rides. Each end 129 of the shaft 124 extends into the mechanism used for adjusting the tension of the conveyor belt 110. Each end of the shaft utilizes a bearing housing 144 configured with slots 148, 150 for mating with upper and lower rails 154, 156. The bearing housing 144 is capable of longitudinal translation along the rails 154, 156 by adjustment bolts 160 on both sides 128, 130 of the inner boom 20. The adjustment bolts 160 extend through a housing panel 164 rigidly secured to a side panel 170 of the inner boom 20. When the conveyor belt 110 is installed and circumscribes the inner and outer booms 20, 18 the adjustment bolt 160 can be either advanced or retracted as needed to increase the tension load on the conveyor belt 110 or lessen the tension on the belt.

FIG. 7 provides an exploded view of the entire conveyor system 10. The conveyor belt 110 is driven by a drive motor 175 that is operably coupled to a series of rollers 177 that power the overlain conveyor belt 110. When the conveyor system 10 is in the fully extended position, that is when the inner and outer booms 20, 18 are aligned, the conveyor belt 110 is designed to extend the set number of feet of the outer boom length as well as the additional number of feet of the inner boom length for a combined inner and outer boom length. The conveyor belt 110 tension is then set at a predetermined load. When the inner boom 20 and the outer boom 18 are in the stowed position at roughly a 90 degree angle to one another, the conveyor system 10 is designed to allow the pre-set tension in the belt to relax slightly. The relaxed tension in the folded configuration serves to increase the life of the belt.

While the preferred form of the present invention has been shown and described above, it should be apparent to those skilled in the art that the subject invention is not limited by the figures and that the scope of the invention includes modifications, variations and equivalents which fall within the scope of the attached claims. Moreover, it should be understood that the individual components of the invention include equivalent embodiments without departing from the spirit of this invention.

It will be understood that certain features and subcombinations are of utility and may be employed without reference to other features and subcombinations and are contemplated within the scope of the claims. Not all steps listed in the various figures need be carried out in the specific order described.

I claim:

1. A mobile power driven conveyor for moving packages or other objects to and from various elevated locations, comprising:
    a base element secured to a frame of a vehicle;
    an inner boom structure rotatably secured to the base element;
    an outer boom structure pivotally secured to the inner boom;
    a conveyor belt extending along the inner and outer boom and over a plurality of support members to form an upper conveying flight along top portions of the inner and outer booms and a return flight along lower portions of the inner and outer booms; and
    a conveyor belt tensioning mechanism disposed within the inner boom structure wherein when in a conveying mode the inner and outer booms are capable of being aligned with one another to increase the overall length of the conveyor and when in a highway mode are configurable at roughly a 90 degree angle to one another.

2. The mobile power driven conveyor for moving packages or other objects to and from various elevated locations of claim 1, wherein a lift cylinder with a first end secured to the base element and a second end secured to the inner boom controls elevation of the inner boom.

3. The mobile power driven conveyor for moving packages or other objects to and from various elevated locations of claim 1, wherein the lift cylinder is hydraulically operated.

4. The mobile power driven conveyor for moving packages or other objects to and from various elevated locations of claim 1, wherein a fold cylinder with a first end secured to the first elongated boom structure and the second end secured to the second elongated boom structure controls elevation of the second elongated boom structure.

5. The mobile power driven conveyor for moving packages or other objects to and from various elevated locations of claim 4, wherein the fold cylinder is hydraulically operated.

6. The mobile power driven conveyor for moving packages or other objects to and from various elevated locations of claim 1, wherein the conveyor belt tensioning mechanism utilizes shaft mounted tension adjustable idler rollers for obtaining the desired belt tension.

7. The mobile power driven conveyor for moving packages or other objects to and from various elevated locations of claim 6, wherein at least one linearly displaceable bearing housing facilitates the application of tension to the conveyor belt.

8. The mobile power driven conveyor for moving packages or other objects to and from various elevated locations of claim 7, wherein a slotted bearing housing laterally translates on upper and lower slides mounted to a housing panel secured to side panels of the inner boom.

9. The mobile power driven conveyor for moving packages and other objects to and from various elevated locations of claim 1, wherein conveyor lugs are secured across the conveyor belt at spaced intervals for preventing slippage of the packages or other objects when the first and second elongated boom are in an elevated orientation.

10. A truck mounted material transfer unit comprising: a base unit;
    an inner boom rotationally secured to the based unit;
    an outer boom pivotally secured to the inner boom;
    a conveyor belt circumscribing the inner and outer boom and at least one conveyor drive pulley; and
    a tensioning system for removing excess slack in the conveyor belt.

11. A material transfer unit according to claim 10 wherein the inner boom further comprises at least one swivel attachment configured to rotate the outer boom.

12. A material transfer unit according to claim 10 wherein the conveyor further comprises a tensioner assembly for adjusting tension in the conveyor belt.

13. A truck with a conveyor system for transporting building materials to a station remote from the truck, the truck having a bed from which materials may be serially added to the conveyor system and then removed from the conveyor system at a remote station, the truck with conveyor system comprising:
    a base platform mounted to the truck bed;
    an inner boom rotationally mounted to the base platform and configured to extend outward from the bed platform over a range of elevations and directions;
    an outer boom pivotally secured to the inner boom;
    a continuous conveyor belt circumscribing the inner and outer booms; and
    an inner boom tensioner mechanism for maintaining a predetermined tension in the conveyor belt wherein the combination of inner boom and outer boom can be configured to minimize the overall length of the conveyor system while in transit in order to comply with applicable state overall vehicle length regulations and also maximize conveyor system length during conveying operations.

14. The truck with a conveyor system of claim 13, wherein a first lift cylinder with a first end pivotally secured to a shaft extending between first and second vertical support members and a second end secured to the inner boom, the first lift cylinder configured to control elevation of the inner boom.

15. The truck with a conveyor system of claim 14, wherein the first lift cylinder is hydraulically operated.

16. The truck with a conveyor system of claim 15, wherein a second lift cylinder with a first end secured to the first inner boom structure and a second end secured to the outer boom structure controls elevation of the outer boom.

17. The truck with a conveyor system of claim 16, wherein the second lift cylinder is hydraulically operated.

18. The truck with a conveyor system of claim 13, wherein a conveyor belt tensioning mechanism utilizes shaft mounted tension adjustable idler rollers for maintaining the desired belt tension.

19. The truck with a conveyor system of claim 18, wherein at least one linearly displaceable bearing housing facilitates the application of tension to the idler rollers.

20. The truck with a conveyor system of claim 19, wherein the bearing housing laterally translates on upper and lower rails.

21. The truck with a conveyor system of claim 13, wherein conveyor lugs are secured across the conveyor belt at spaced intervals for preventing slippage of the packages or other objects when the first and second elongated boom are in an elevated orientation.

22. A mobile power driven conveyor for moving packages or other objects to and from various elevated locations, comprising:
- a base element secured to a frame of a vehicle;
- a support element, rotatably secured to the base element;
- an inner boom structure rotatably secured to the support element;
- an outer boom structure rotatably secured to the inner boom;
- a conveyor belt extending along the inner and outer boom and over a plurality of support members to form an upper conveying flight along top portions of the inner and outer booms and a return flight along lower portions of the inner and outer booms; and
- a conveyor belt tensioning mechanism disposed within the inner boom structure wherein when in a conveying mode the inner and outer booms are capable of being aligned with one another to increase the overall length of the conveyor and when in a highway mode are configurable at roughly a 90 degree angle to one another.

23. The mobile power driven conveyor of claim 22, wherein the support element is comprised of at least two closely spaced vertically oriented plates.

\* \* \* \* \*